Patented May 16, 1950

2,508,005

UNITED STATES PATENT OFFICE 2,508,005

PREPARATION OF CYCLIC THIOETHERS

Seaver A. Ballard, Orinda, and Rupert C. Morris, Berkeley, Calif., assignors to Shell Development Company, San Francisco, Calif., a corporation of Delaware No Drawing. Application April 7, 1947, Serial No. 739,946

9 Claims. (Cl. 260—327)

This invention relates to the production of cyclic thioethers. More particularly, the invention relates to a new process for the practical and economical production of six-membered cyclic thioethers containing a para-oxygen atom, and minor amounts of six-membered cyclic thioethers containing a para-sulfur atom in the ring. In one of its most specific embodiments the invention provides an improved method of producing 1,4-thioxane and its homologues.

As a compound, 1,4-thioxane, or 1,4-oxathiane, was known to be capable of existence as early as 1912. However, the "thioxanes," i. e. compounds of the general formula

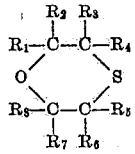

in which $R_1$ through $R_8$ each represents the hydrogen or the halogen atom, or an organic radical, have never been extensively utilized for the many commercial applications for which they are suitable. The thioxanes are chemically and structurally similar to the dioxanes, differing only in the substitution of a sulfur atom for one of the oxygen atoms in the ring of the latter. They exhibit many similar physical and chemical properties, for example, thioxane forms oxonium addition compounds, mercuric salts, and the like with acids, salts, etc., as does dioxane. Thioxane, like dioxane, is stable at its boiling temperatures, is weakly basic, and is an excellent solvent for many substances. By virtue of the sulfur atom in the ring, the thioxanes possess certain differences in properties which make them even more valuable than the dioxanes for numerous applications. For example, while exhibiting solvent properties for organic compounds similar to the dioxanes, they are only slightly soluble in water and may therefore be applied to extraction and the like processes. Similarly, while exhibiting properties of stability and the formation of addition compounds in the presence of strong acids analogous to such characteristic of the dioxanes, the thioxanes by virtue of a much higher boiling temperature (150° C. as compared to 101° C.) form improved reaction media for sulfonation and similar reactions which employ strong acids at elevated temperatures.

In spite of their obvious value, the thioxanes have received but limited commercial application for lack of a practical and economical method for their production. It is known that thioxanes and dithianes can be prepared by treating a 2,2'-dihalo-diethyl ether or thioether with a salt of hydrogen sulfide under various reaction conditions. However, the di-iodo ethers, for example, are far too expensive to serve as the starting materials for an economical production process, and the dichloro-ethers include volatile compounds such as mustard gas which are extremely dangerous to handle and require special equipment and many precautions for the safety of the personnel engaged in the process.

It has now been discovered that a wide variety of compounds which may be characterized by the general formula

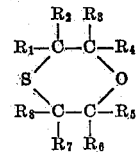

in which $R_1$ through $R_8$ each represents the hydrogen atom or a lower alkyl radical such as the ethyl, methyl, propyl or butyl radical, can be readily obtained from starting materials that are neither dangerous to handle nor expensive to produce. The present invention may therefore be generally stated as relating to a process for the production of cyclic thioethers containing oxygen atoms in the para position of a six-membered ring by the thermal cyclization of polymeric substances having the general formula

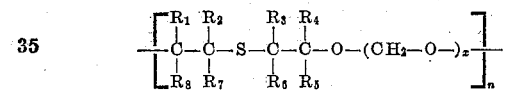

in which $R_1$ through $R_8$ each represents the hydrogen or halogen atom or a lower alkyl radical such as a methyl, ethyl, propyl, or butyl radical, $n$ represents an integer greater than one, and $x$ is zero or one.

The polymeric substances forming the starting materials for the process of the invention are often formed as high boiling side-reaction products in the manufacture of organic sulfur-containing compounds. Particularly suitable starting materials for the present process are produced by the polymerization of 2,2'-dihydroxy dialkyl sulfides or by the treatment of vinyl ethers with hydrogen sulfide. In general, suitable polymeric starting materials may be produced by any suitable condensation reaction leading to the formation of linear polymeric chain-like molecules in which ethylene ethylenoxy sulfide groups or their homologues are linked directly or through methylenoxy groups into the polymeric molecules.

A particularly preferable subclass of the polymeric starting materials may be characterized by the general formula

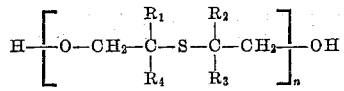

in which $R_1$ through $R_4$ each represents the hydrogen ion or an organic radical, preferably a lower alkyl radical such as the methyl, ethyl, propyl or butyl radical. Polymers of this general structure may be readily produced by methods such as the polymerization of one or more 2,2'-dihydroxy dialkyl sulfides. The process described and claimed in the copending application of Ballard, Morris and Van Winkle, Serial No. 702,053, filed October 8, 1946, now Patent 2,484,369, for the production of polymeric materials comprising chain-like structures with terminal hydroxyl groups by heating one or more 2,2'-dihydroxy dialkyl sulfides in the presence of a dehydration promoting catalyst provides a particularly suitable method by which this subclass of starting materials may be obtained. Illustrative examples of the particularly preferred polymeric starting materials include such representative individual compounds as poly bis(2-hydroxyethyl) sulfide, poly bis(2 - hydroxyiso - propyl) sulfide, poly 2-hydroxyethyl 2-hydroxyisopropyl sulfide, poly bis(1,1-dimethylhydroxyethyl) sulfide, poly 2-hydroxyethyl 1,1-dimethylhydroxyethyl sulfide, poly isopropyl 1,1 - di - methyl-2 hydroxyethyl sulfide, poly bis(1-methylolpropyl) sulfide, poly hydroxyethyl 1-methylolpropyl sulfide, bis(1-methylolbutyl) sulfide, poly hydroxyethyl 1-methylolbutyl sulfide, poly bis(1 - methylolpentyl) sulfide, poly hydroxyethyl 1-methylolpentyl sulfide, poly 2-hydroxyisopropyl 1-methylolpentyl sulfide, poly 2-hydroxytertiarybutyl 1-methylolpentyl sulfide, poly 1-methylolpropyl 1-methylolpentyl sulfide, poly 1-methylolbutyl 1-methylolpentyl sulfide, poly 1-methylolpropyl 1-methylolbutyl sulfide, poly 2-hydroxytertiarybutyl 1 - methylolbutyl sulfide, poly 2-hydroxyisopropyl 1-methylolbutyl sulfide, poly 2-hydroxyisopropyl 1-methylolpropyl sulfide, poly 2 - hydroxytertiarybutyl 1 - methylolpropyl sulfide, poly 1 - methylol - 2 - methyl - propyl hydroxyethyl sulfide, poly bis(1-methylol-2-methylpropyl) sulfide.

Other polymeric materials which form preferred starting materials for the present process may be characterized by the general formula

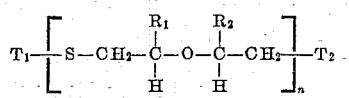

in which $R_1$ and $R_2$ each represents the hydrogen atom or a lower alkyl radical such as a methyl, ethyl, propyl or butyl radical, $n$ is an integer greater than one, $T_1$ represents the hydrogen atom or the terminal group

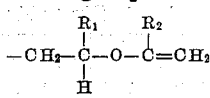

and $T_2$ represents a sulfhydryl radical or the terminal group

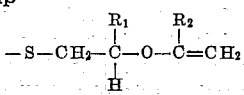

A particularly satisfactory method of producing polymers having this general structure is described and claimed in the copending application of Vaughan and Rust, Serial No. 585,388, filed March 28, 1945. By the process of the Vaughan and Rust application polymers of the illustrated structure are produced by the photochemical addition of hydrogen sulfide to unsaturated oxyethers under the influence of ultraviolet radiations.

Still other suitable raw materials for the present process comprise polymeric substances in which the recurring nuclear

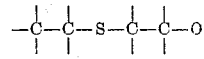

group contains substituent groups or atoms such as halogen atoms or halogenated hydrocarbon radicals and polymers in which the nuclear groups are joined into the linear chains by groups such as the methylenoxy group. These polymers may be produced by various of the methods described above or by methods such as the treatment of a 2,2'-dihydroxy dialkyl sulfide with ethylal. Illustrative examples of such polymeric materials include formaldehyde 2,2' - dihydroxy - diethyl sulfide polyacetal, poly bis(1-chloro-2-hydroxyethyl) sulfide, formaldehyde bis(1 - methyl - 2 - hydroxyethyl) sulfide polyacetal, formaldehyde bis(2-methyl-2-hydroxyethyl) sulfide polyacetal, poly bis(2 - hydroxybutyl) sulfide, poly bis(2 - chloro - 2 - hydroxyethyl) sulfide, poly bis(1,2 - dichloro - 2 - hydroxyethyl) sulfide, poly bis(2 - hydroxypropyl) sulfide, poly 2-hydroxyethyl 2-hydroxypropyl sulfide, formaldehyde bis(2-hydroxypropyl) sulfide polyacetal, poly 2-hydroxyethyl 1-chloro-2-hydroxypropyl sulfide, poly 2-hydroxypropyl 2-hydroxyisopropyl sulfide, poly bis(1,2-dimethyl-2-hydroxyethyl) sulfide, formaldehyde bis(1 - methylolpropyl) sulfide poly - acetal, formaldehyde 1 - methylolpropyl 2 - hydroxyethyl sulfide polyacetal.

The preferred method of conducting the present process comprises a simple thermal decomposition or cyclization of the suitable polymeric material. The cyclization process may be conducted in a batchwise or a continuous manner, the latter, of course, being preferable in large scale operations. Any of the numerous types of apparatus commonly employed for the thermal decomposition of liquid or solid materials may suitably be employed. In general, apparatus embodying heated tubular reactors containing inert substances to restrict the flow of liquid reactants is particularly suitable for the continuous cyclization of liquid polymers. Other types of apparatus embodying, for example, heated surfaces upon which the materials to be decomposed are impinged, simple containers having a means for heating and allowing the escape of the volatile materials, and the like may suitably be employed whenever their use is practical or desirable.

The cyclization is rapid and efficient under atmospheric pressures at temperatures from about 150° C. to about 500° C. However, when other considerations render it desirable, the process may be conducted under pressures substantially above or below normal atmospheric pressure. The optimum cyclization temperature will, of course, depend upon the particular polymer employed, the pressure under which the operation is conducted and the presence or absence of a catalyst. In the cyclization of liquid polymers under atmospheric pressure in the absence of any catalytic materials, temperatures of between about 190° C. and about 300° C. have been found to be particularly satisfactory. In general, the optimum conversion temperature for an uncatalyzed reaction at atmospheric pressure is in a temperature range that is slightly above the boiling temperature of the particular polymeric starting material employed which, in the case of the particularly preferred starting materials, is between about 190° C. and about 210° C.

One particularly advantageous feature of the present process is that the cyclic thioethers may be readily obtained in practically quantitative yields in the complete absence of catalysts or other additives. Therefore, since both the polymeric starting materials and their cyclization products are non-corrosive organic materials, the apparatus employed in the starting, handling and conducting of the reactants and reaction products may suitably be constructed of any of the commonly employed metals or ceramic materials without danger of contamination of the products. However, in certain cases, the temperatures required for the cyclization process can be reduced by the use of various cyclization or depolymerization catalysts such as inorganic acids, sulfonic acids, and the like.

As the starting materials employed in the process are generally liquids or low-melting solids, no solvents or diluents are required. However, whenever it is desirable, any suitable diluent or solvent such as the aromatic, alicyclic, saturated acyclic, or aliphatic aromatic hydrocarbons may be employed. In the preferred mode of operation, i. e. in the absence of either a catalyst or a diluent, the process requires no separation or recovery of solvents from the reaction products and may be conducted in apparatus constructed of any of the commonly employed materials.

The present invention thus provides a practical and economical process for the production of cyclic thioethers which is adaptable for either large or small scale operations. The nature of the cyclic thioethers is such that even when mixtures of the polymeric starting materials are employed in the presence or absence of diluents or solvents, the resulting mixed reaction products consist of compounds varying widely in their physical and chemical properties, thereby allowing an easy separation of the individual compounds. In general, each ethylene ethylenoxy sulfide polymer forms but two cyclization products in substantial amounts, i. e. predominant amounts of a cyclic thioether containing an oxygen atom in the para position of a six-membered ring and minor amounts of a similar thioether containing a sulfur atom in the para position.

Illustrative examples of the individual cyclic thioethers containing an oxygen atom in the para position of a six-membered ring which may be readily produced by the present process include 1,4-thioxane; 2-methyl-1,4-thioxane; 3-methyl-1,4-thioxane; 2,6-dimethyl-1,4-thioxane; 3,5-dimethyl-1,4-thioxane; 2,3-dimethyl-1,4-thioxane; 2-ethyl-1,4-thioxane; 3-ethyl-1,4-thioxane; 2,6-diethyl-1,4-thioxane; 3,5-diethyl-1,4-thioxane; 2,3-diethyl-1,4-thioxane; 2-propyl-1,4-thioxane; 3-propyl-1,4-thioxane; 2-butyl-1,4-thioxane; 3-butyl-1,4-thioxane; 2,6-dipropyl-1,4-thioxane; 3,5-dipropyl-1,4-thioxane; 2,3-dipropyl-1,4-thioxane; 2-methyl-6-propyl-1,4-thioxane; 2-methyl-5-propyl-1,4-thioxane; 2-methyl-3-propyl-1,4-thioxane; 2-methyl-6-ethyl-1,4-thioxane; 3-methyl-5-ethyl-1,4-thioxane; 2-methyl-3-ethyl-1,4-thioxane; 2-ethyl-6-methyl-1,4-thioxane; 3-ethyl-5-methyl-1,4-thioxane; 2-ethyl-3-methyl-1,4-thioxane; 2-ethyl-6-propyl-1,4-thioxane; 3-ethyl-5-propyl-1,4-thioxane; 2-ethyl-3-propyl-1,4-thioxane; 2-propyl-3-ethyl-1,4-thioxane.

The process of this invention is further illustrated by the following specific examples. It is to be understood, however, that there is no intention of being limited by any details recited in the examples since many variations of conditions and materials may be employed.

Example I

A polymer of bis(2-hydroxyethyl) sulfide was thermally decomposed in the absence of a catalyst and at substantially atmospheric pressure. The temperature of the reactor was maintained at approximately 200° C. and the temperature of the vaporous reaction products measured at the still head was from about 140° C. to 160° C. From 66 parts by weight of a polymer having an average molecular weight of 600, a yield of 64 parts by weight of distillate boiling at 140° C.–160° C. and a residue of 2 parts by weight were obtained. The purified reaction products, which were identified by their melting points and chemical analysis to be 1,4-thioxane and 1,4-dithiane, were obtained in yields of, respectively, 86% and 85% based on the weight of the polymeric starting material.

Identification of the purified reaction products:

1,4-thioxane

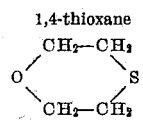

M. P. found _____°C__ −16 to −18
Literature _____°C__ −17
$n_D^{20}$ found _____ 1.5083
Literature _____ 1.5081
% Sulfur found _____ 31.1
Calculated _____ 30.8

1,4-dithiane

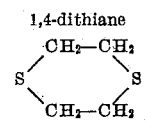

M. P. found _____°C__ 111 to 112
Literature _____°C__ 112

Example II

Substantially equimolar quantities of liquefied hydrogen sulfide and divinyl ether were introduced into an evacuated quartz bomb tube which was then sealed and placed in a quartz container packed with ice. A 400-watt quartz mercury arc lamp was then placed at about 6 inches from the bomb. Under the influence of the ultraviolet radiation the reaction proceeded rapidly and in about 7 minutes a white semi-solid material began to form near the bottom of the reactor. The irradiation was continued for a total period of 10 minutes, at the end of which the reaction mixture distilled at about 240° C. under a pressure of 2 cm. (absolute) and about 7.3% of the mixture thus removed. After a few hours the residue formed a white, somewhat greasy solid polymer having a molecular weight (cryo. benzene) of 1000 to 1100. The polymer thus obtained undergoes cyclization at a temperature of about 200° C. to form a predominant amount of 1,4-thioxane and a minor amount of 1,4-dithiane.

Example III

Equimolar quantities of 2,2'-dihydroxy-diethyl sulfide and ethylal were dissolved in benzene in the presence of a small amount of p-toluenesulfonic acid. The solution was refluxed for four days and an azeotropic mixture boiling at 66° C.-69° C. was removed by distillation. A second portion of benzene was added and the removal by distillation of the azeotropic mixture was continued until the temperature of the residual mixture rose to 140° C. The residue was then dissolved in a third portion of benzene, washed with a concentrated sodium carbonate solution, and dried. The yellow, slightly viscous liquid residue was found to be formaldehyde 2,2'-dihydroxy-diethyl sulfide polyacetal having a molecular weight of 825 (ebl. benzene). At a temperature of about 200° C. the formaldehyde 2,2'-dihydroxy-diethyl polyacetal is decomposed with the formation of predominant amounts of 1,4-thioxane and formaldehyde and minor amounts of 1,4-dithiane.

*Example IV*

When poly bis(2-hydroxyisopropyl) sulfide is subjected to a thermal decomposition at a temperature of about 225° C., the reaction products contain predominant amounts of 3,5-dimethyl-1,4-thioxane having the structural formula

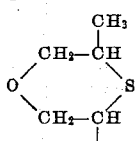

*Example V*

When diisopropenyl ether is reacted with equimolar amounts of hydrogen sulfide under the influence of ultraviolet radiation and the resulting polymer subjected to a thermal decomposition at about 225° C., the reaction products contain predominant amounts of 2,6-dimethyl-1,4-thioxane having the structural formula

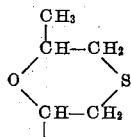

*Example VI*

When 2,2'-dihydroxy-diisopropyl sulfide is reacted with equimolar amounts of ethylal in the presence of p-toluenesulfonic acid in an inert solvent a polymer of formaldehyde 2,2'-dihydroxy-diisopropyl sulfide is formed which thermally decomposes at a temperature of about 225° C. to form predominant amounts of 3,5-dimethyl-1,4-thioxane and formaldehyde.

The invention claimed is:

1. A process comprising heating a poly 2,2'-dihydroxy-diethyl sulfide having a molecular weight of about 600 to a temperature of between about 190° C. and about 210° C. whereby there is produced 1,4-thioxane, and collecting the vaporous reaction products.

2. A method which comprises heating a polymer having the general formula

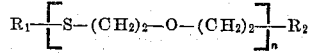

in which $n$ is an integer greater than one and $R_1$ represents a substituent selected from the group consisting of the hydrogen atom and the radical $-(CH_2)_2-O-CH=CH_2$ and $R_2$ represents a substituent selected from the group consisting of the sulfhydryl radical and the radical $$-S-(CH_2)_2-O-CH=CH_2$$

to a temperature of between about 190° C. and about 300° C. whereby there is produced 1,4-thioxane, and collecting the vaporous reaction products.

3. A process whereby formaldehyde 2,2'-dihydroxy-diethyl sulfide polyacetal is subjected to thermal cyclization at a temperature of between about 190° C. and about 300° C., said thermal cyclization at elevated temperature being productive of 1,4-thioxane.

4. A method whereby a polymer having the general formula

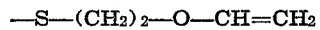

in which $n$ is an integer greater than one is subjected to thermal cyclization at a temperature of between about 190° C. and about 210° C., said thermal cyclization at elevated temperature being productive of 1,4-thioxane and of minor amounts of 1,4-dithiane.

5. A process comprising heating poly 2,2'-dihydroxy-diethyl sulfide in the presence of a small amount of a strong acid at temperatures of between about 150° C. and about 500° C. whereby there is produced 1,4-thioxane.

6. A process which comprises heating to a temperature of between about 150° C. and about 500° C. a poly(di-2-hydroxyalkyl sulfide) whereby there are produced cyclic thioethers containing an oxygen atom in the para position of a six-membered ring.

7. A process which comprises heating to a temperature of between about 150° C. and about 500° C. a formaldehyde di-2-hydroxyalkyl sulfide polyacetal whereby there are produced cyclic thioethers containing an oxygen atom in the para position of a six-membered ring.

8. A process which comprises heating to a temperature of between about 150° C. and about 500° C. a polymeric hydrogen sulfide di-2-alkenyl ether adduct whereby there are produced cyclic thioethers containing an oxygen atom in the para position of a six-membered ring.

9. A process which comprises heating to a temperature of between about 150° C. and about 500° C. a polymeric material of the group consisting of poly(di-2-hydroxyalkyl sulfides), formaldehyde di-2-hydroxyalkyl sulfide polyacetals, and hydrogen sulfide di-2-alkenyl ether adducts whereby there are produced cyclic thioethers containing an oxygen atom in the para position of a six-membered ring.

SEAVER A. BALLARD.
RUPERT C. MORRIS.

REFERENCES CITED

The following references are of record in the file of this patent:

J. Am. Chem. Soc., 56, 2177–2180 (1934).